Dec. 9, 1969  W. LEHNER  3,482,871

SPRING-MOUNTED VEHICLE SEAT

Filed April 3, 1967  3 Sheets-Sheet 1

INVENTOR:
Wilhelm Lehner
BY
Spencer & Kaye
Attorneys

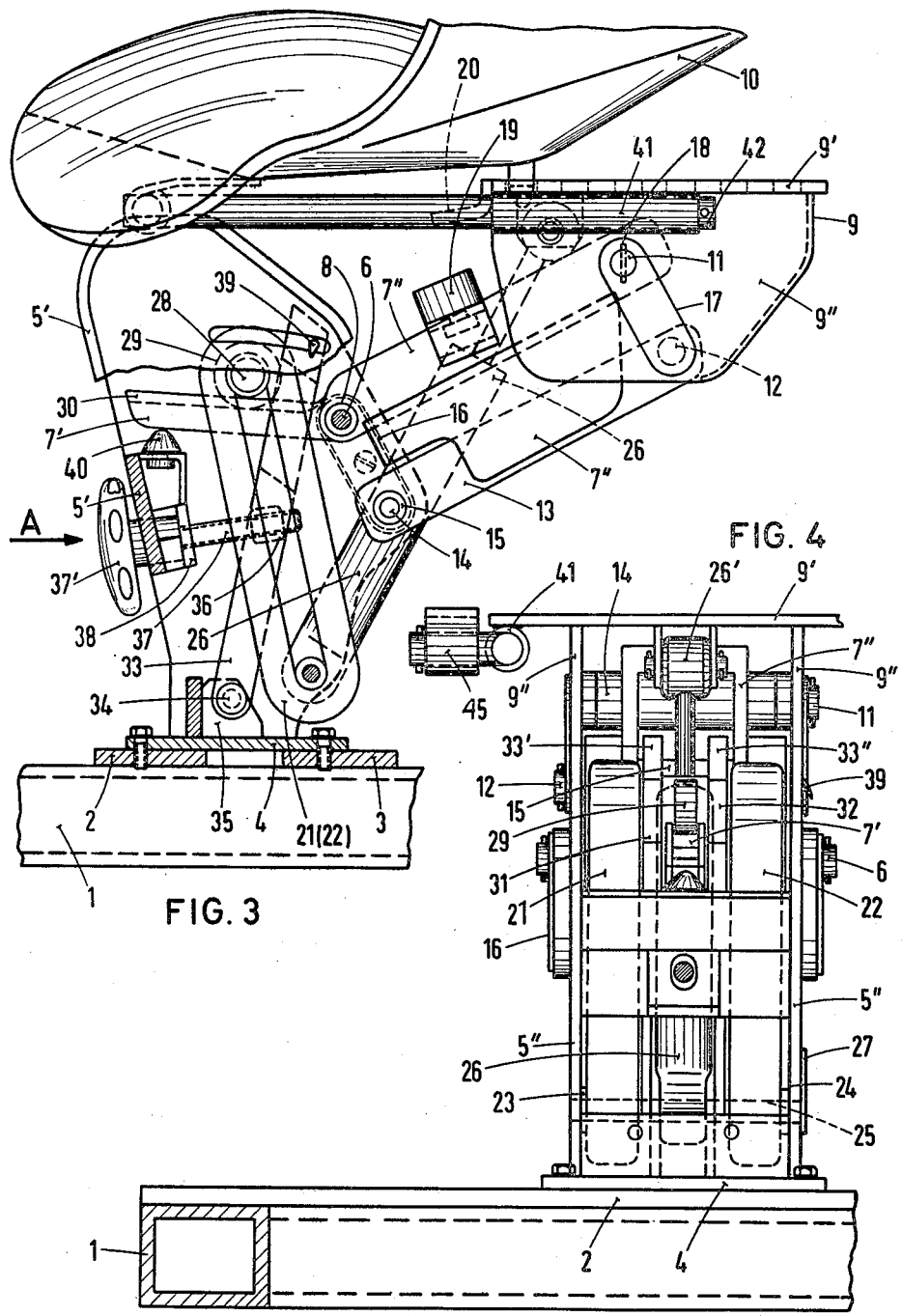

United States Patent Office 3,482,871
Patented Dec. 9, 1969

3,482,871
SPRING-MOUNTED VEHICLE SEAT
Wilhelm Lehner, Sebastian-Kneipp-Strasse 98,
Amberg, Germany
Filed Apr. 3, 1967, Ser. No. 627,941
Int. Cl. B60n 1/02
U.S. Cl. 297—325                        15 Claims

ABSTRACT OF THE DISCLOSURE

A vehicle seat especially for a tractor or the like which is provided with adjustable resilient suspension means underneath the seat body which are slidable along one arm of a two-armed lever, the other arm of which is connected to a support carrying the seat body.

BACKGROUND OF THE INVENTION

The present invention relates to a vehicle seat, especially for agricultural vehicles, for example, tractors, which is provided with a support for the seat body, for example, a bucket seat, and with resilient elements, preferably in the form of rubber rings, for the resilient suspension of the seat which are suspended at one side on a fixed part of the base or frame supporting the seat and are connected at the other side to a further suspension point which, when the seat is resiliently deflected downwardly will be displaced so as to tighten the resilient elements. The seat according to the invention may be further provided with a vibration damper which may be connected at one side to the support of the seat body and at the other side to the base supporting the seat.

The resilient seat constructions of the known types are provided with resilient elements which are disposed behind the back rest of the seat, while the adjustable suspension for the resilient elements is mounted on the seat support itself. This results in a relatively large expansion of the resilient elements by the weight of the driver and therefore exerts an excessive strain on these elements which reduces their useful life.

The known seat constructions also have the disadvantage that their adjusting device in the form of a threaded spindle for varying the tension of the resilient elements is located behind the back rest. The driver must therefore bend back over the back rest if he wishes to operate the adjusting spindle while sitting on his seat. This requires an agility which very few drivers possess.

SUMMARY OF THE INVENTION

It is an object of the present invention to provide a seat construction which eliminates the above-mentioned disadvantages of the known driver's seats of this type, considerably improves the functional value of such a seat, and provides it with an improved resilient suspension which is also very easily adjustable during the operation of the vehicle in accordance with different road conditions and the weight of the particular driver.

For attaining this object, the invention provides the support of the actual seat, for example, a bucket seat, to be mounted on one arm of a two-armed lever, the other arm of which carries the adjustable means on which the resilient suspension elements are mounted in a position considerably closer to the pivot axis of this lever than the position of the seat support on the first arm. The means on which the resilient elements are suspended are therefore no longer provided on the seat support. By the inventive arrangement of the seat support and the adjustable suspension of the seat on a two-armed lever the result is attained that the distance of movement of the seat support during the resilient deflection of the seat will be considerably reduced so that the resilient suspension elements will be much less expanded and will therefore last for a considerably greater length of time than the resilient elements of previous seat suspensions, even though the degree of resilience and thus the comfort of the seat remains unchanged.

According to a preferred embodiment of the invention, the mentioned two-armed lever extends forwardly from the seat support and underneath the seat itself. This permits a very space-saving arrangement for the suspension mechanism. Since contrary to the known seat constructions in which the resilient suspension elements are located behind the back rest of the seat the invention provides the area behind the back rest to be free, the driver of the tractor can lean over easily toward the rear so as to connect another machine to the tractor or disconnect it therefrom with less difficulty than previously. By providing the resilient suspension mechanism underneath the seat, the invention further permits the adjusting means for the resilient elements to be mounted in such a position that they may be easily reached by the driver while sitting on the seat by merely bending down forwardly. A preferred feature of the invention for varying the tension of the resilient elements consists in the provision of a threaded spindle which may be turned by a control knob on the front side of the housing which encloses the suspension mechanism, and thereby shifts the upper suspension point of the resilient elements along an inclined surface of the forwardly extending second arm of the two-armed lever. This arm may for this purpose be provided with a guide groove into which a roller engages which is mounted on the upper suspension rod and is slidable along the surface of this groove, which is preferably downwardly inclined toward the pivot axis of the two-armed lever.

When the position of the upper suspension point on the second lever arm is shifted in one direction or the other, the distance changes between this point and the other suspension point which is located in a fixed position to the seat support, so that the tension of the resilient elements will be either increased or decreased depending upon whether the distance between the two suspension points is increased or decreased. In order to require as little force as possible for carrying out the necessary adjusting movement of the adjustable suspension point of the resilient elements, these elements are now no longer suspended directly on the adjusting device, but the invention provides that the adjustable suspension point is pressed by the tension of the resilient elements against an upright control arm which is pivotably mounted at its lower end on the frame supporting the seat and is provided with a nutlike member into which the adjusting spindle is screwed. This spindle is preferably rotatably but nonslidably mounted in the front wall of the housing enclosing the resilient elements so that, when the spindle is turned, the angle of inclination of the control arm will be changed. The adjustable upper suspension point pressing against the control arm then follows the movement of this arm. Consequently, an adjustment of the inclination of the control arm also varies the tension of the resilient elements.

The adjustable suspension point may be provided in the form of a rod on which the resilient elements are suspended. Another feature of the invention provides that this suspension rod carries a pair of rollers which may be guided by the mentioned control arm and will roll along this arm during the resilient movement of the seat so that the friction between the suspension rod and the control arm will be reduced.

The features and advantages of the present invention will become further apparent from the following detailed description thereof which is to be read with reference to the accompanying drawings, in which—

FIGURE 3 shows, partly broken away and in section, a side view of the seat; while FIGURE 4 shows a view of the seat as seen in the direction of the arrow A in FIGURE 3, in which, however, for the sake of a better disclosure of the construction the front wall of the housing enclosing the resilient elements as well as the control knob of the adjusting spindle are omitted.

Figure 1:
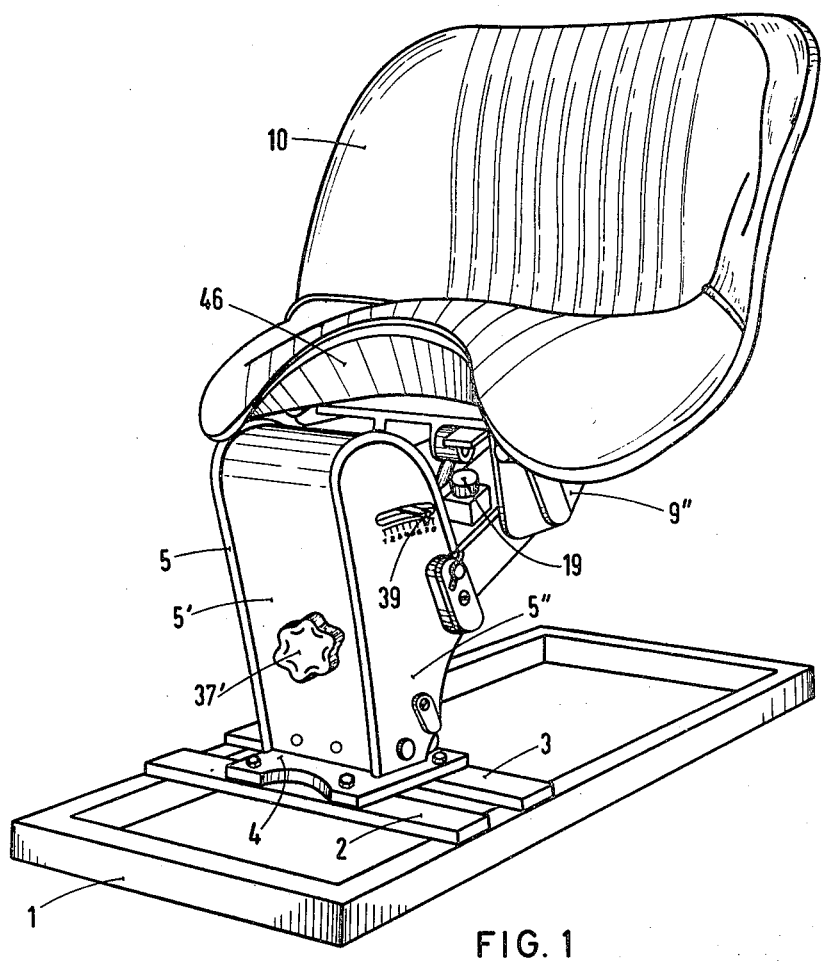
FIGURE 1 shows a perspective front view of the seat according to the invention.

As illustrated in the drawings, the base supporting the seat assembly comprises a tubular frame 1 upon which two crossbars 2 and 3 are welded which carry bolted thereon the base plate 4 of a housing 5 which encloses the spring suspension mechanism as will hereafter be described in detail. Housing 5 comprises a front wall 5' and two side walls 5". The front wall 5' may be composed of several parts, one part of which is then preferably removably connected to the remainder of the housing so as to permit an easy access to the suspension elements which are mounted within the housing.

The opposite side walls 5" of housing 5 support the pivot pin 6 of a two-armed lever 7', 7" which is pivotably mounted on this pin between the two arms of the lever by means of a bushing 8. As shown in FIGURE 3, the forwardly projecting arm 7' is considerably shorter than the rear arm 7".

The longer rear arm 7" of this lever is secured to and carries the support 9 of the seat body which is provided in the form of a bucket seat. This support 9 comprises an upper horizontal plate 9'. In the lateral plates 9", two pivot pins 11 and 12 are mounted above each other but laterally offset relative to each other, and each of these pins is inserted through a bushing 14 or 15 which is rigidly secured to arm 7" or to a lever 13, respectively, which extends underneath and parallel to the arm 7". Arm 7" has a U-shaped cross section and its side walls are step-shaped so as partly to cover up the sides of lever 13. The lower end of this lever 13 is pivotably mounted between the side walls 5" of housing 5 by carrying bushings which are rotatable on pivot pins 14 which are mounted on the side walls 5". When speaking in connection with the present invention of levers 7" and 13, the power transmitting element is meant as a unit even if the lever is composed of several parts which are arranged parallel to and spaced from each other.

The two mentioned levers 7" and 13 form a guide unit for insuring that the seat support 9 and thus also the seat 10 will only be displaced within parallel planes when moving up and down resiliently so that no tilting of the seat and seat support can possibly occur. The connecting straps 16 and 17 together with the cotter pins 18 prevent the pivot pins 6, 14 and 11, 12 from falling out of the respective bushings into which they are inserted.

At the side facing the seat 10, arm 7" of the upper lever 7', 7" is provided with a resilient buffer 19, for example, of rubber, which serves as a shock absorber and is adapted to be compressed by a projection 20 on the front end of the supporting plate 9' when the seat is depressed excessively.

The resilient suspension of the seat as illustrated particularly in FIGURE 4 is produced by two parallel rubber rings 21 and 22 which are spaced from each other and are hooked slightly above the base plate 4 of housing 5 over short pieces of pipe 23 and 24 which are welded to the side walls 5" of the housing and are connected by a rod 25 which is inserted through both of them and also extends through the lower eye 26' on the vibration damper 26 which consists of a cylinder and piston, the piston rod of which terminates in an upper eye 26' which is pivotably connected to the supporting plate 9'. Rod 25 is locked in position by a strap 27 on one of the side walls 5" of the housing.

At their opposite sides, the rubber rings 21 and 22 are suspended on a rod 28 which carries at its center a roller 29 which consists, for example, of nylon and engages into a groove 30 in the upper side of the lever arm 7'. As may be seen in FIGURE 3, this groove 30 which serves as a guideway for the roller 29 is downwardly inclined toward the axis of the pivot pin 6 of lever 7', 7".

At both sides of roller 29, which is of importance in connection with the adjusting device for varying the tension of the above-mentioned resilient suspension elements 21 and 22 which device will be subsequently described in detail, rod 28 further carries a pair of metal rollers 31 and 32 and outwardly adjacent to them the resilient suspension elements 21 and 22.

The upper suspension rod 28 for the resilient elements 21 and 22 is adjustable on the upwardly inclined lever arm 7' by means of the roller 29 which engages into the groove 30 in this arm 7'. When the suspension rod 28 is moved further outwardly toward the free end of arm 7', as shown in FIGURE 3, the tension of the resilient elements will be increased. For effecting such an adjustment, a control arm 33 is pivotally mounted at its lower end on a pivot 34 on a fixed part 35 of the housing and extends in the upward direction. Approximately at the center of the length of this arm which consists of two spaced parallel webs 33' and 33", a nutlike member 36 is inserted between and pivotably connected to these two webs, and a threaded spindle 37 which has a control knob 37' on its outer end and extends through the front wall 5' of the housing and is rotatably but nonslidably mounted in a bearing member 38 on the front wall 5' is screwed into the nutlike member 36.

Under the tension of the resilient elements 21 and 22, the adjustable suspension rod 28 is drawn toward the control arm 33, whereby the rollers 31 and 32 on this rod are held in engagement with the webs 33' and 33" of arm 33.

It is evident from the above description that since the guide rollers 31 and 32 and thus also the resilient elements 21 and 22 always follow the pivoting movements of the control rod 33, the resilient elements may be adjusted to the desired tension simply by turning the control knob 37' of spindle 37 in one direction or the other. The particular position to which the control rod 33 is adjusted at any time is indicated on a scale on the outside of the side wall 5" of housing 5 by a pointer 39 which projects from the upper end of the control rod through a curved slot in the side wall 5".

Underneath the lever arm 7', a resilient buffer 40, for example, of rubber, is mounted on the front wall 5' of housing 5. This buffer 40 becomes effective, for example, when the tractor is driven over a bumpy road, and it then prevents the lever 7' from hitting upon any part with a hard impact.

Figure 2:
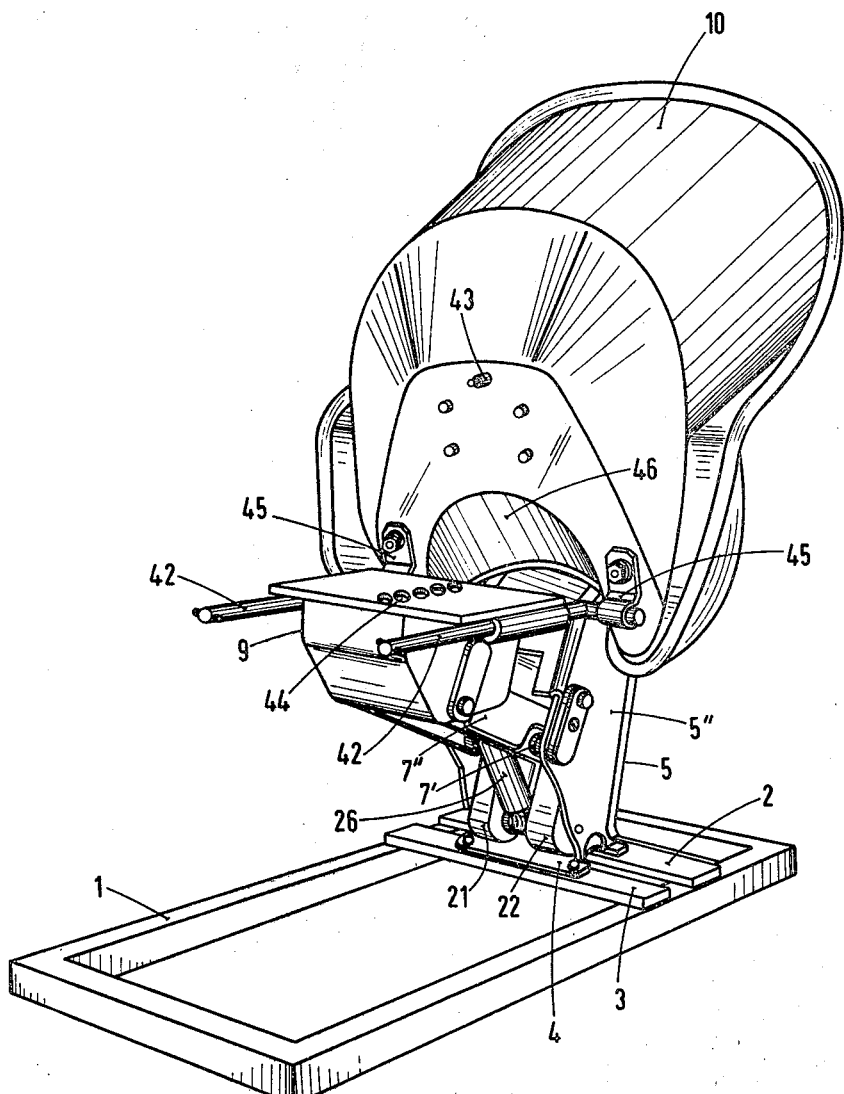
FIGURE 2 shows a perspective rear view of the seat in the forwardly pivoted position.

At both sides of the seat support 9 pieces of pipe 41 are welded upon the lower side of plate 9' in which guide rods 42 are slidable which are pivotably mounted on the seat 10 by means of bearing brackets 45 so as to permit the seat 10 to be adjusted in the longitudinal direction of the vehicle in accordance with the particular height of the driver or the length of his legs. The seat 10 may for this purpose be locked in different positions by the provision of a projection 43 on the lower side of seat 10 which may be inserted into one or another of a row of holes 44 in plate 9' of the seat support 9 by pivoting the seat forwardly and thereby withdrawing its projection 43 out of one hole 44 and by then shifting the seat in the longitudinal direction as much as desired and pivoting it back so as to insert the projection into another hole 44. The pivotability of the seat 10 by means of the bearing brackets 45 also permits it to be pivoted forwardly to such an extent, as shown in FIGURE 2, that it will be drained or kept free of rain water when the seat is not occupied by the driver.

In order to reduce the height of the seat construction, the front side of its seat part is made substantially U-shaped by being provided above the housing 5 with a curved recess 46 into which the housing may project when the seat is moved downwardly.

When the seat moves resiliently upwardly and downwardly in the manner as above described, the rollers 31 and 32 on the upper suspension rod 28 for the resilient elements 21 and 22 will run along the control rod 33.

Although my invention has been illustrated and described with reference to the preferred embodiment thereof, I wish to have it understood that it is in no way limited to the details of such embodiment but is capable of numerous modifications.

Having thus fully disclosed my invention, what I claim is:

1. A vehicle seat comprising a base adapted to be secured to the vehicle, a seat body, a support for said seat body, fixed suspension means on said base, a two-armed lever having a pivot axis and front and rear arms projecting toward the opposite sides of said pivot axis, pivot means for pivotably mounting said lever in a fixed position intermediate said seat body and said base, means for connecting the free end of said rear arm to said seat support, adjustable suspension means including a roller arranged on and adapted to roll along said front arm but not further away from said pivot axis than to a point spaced at a considerably shorter distance from said pivot axis than the point of connection of said rear arm to said seat support, resilient means mounted on and extending between said fixed and adjustable suspension means, and adjusting means for varying the position of said adjustable suspension means on said front arm relative to said pivot axis for varying the tension of said resilient means.

2. A vehicle seat as defined in claim 1, wherein said adjusting means comprise a threaded spindle rotatably mounted in a fixed position above said base and connected to said adjustable suspension means for shifting the latter along said front arm.

3. A vehicle seat as defined in claim 2, wherein said adjustable suspension means comprise a shaft carrying said roller, said resilient means comprising at least one pair of endless rubber members connected at their upper ends to said shaft and at their lower ends to said fixed suspension means.

4. A vehicle seat as defined in claim 3, wherein said front arm is provided with a longitudinal groove in its upper surface extending from its front end at a downwardly inclined angle toward said pivot axis, said roller engaging into said groove and adapted to roll along the upper surface thereof.

5. A vehicle seat as defined in claim 4, wherein said adjusting means further comprise a control arm pivotably connected at its lower end to said base and extending in the upward direction, said shaft engaging under the tension of said resilient means with the upper end of said control arm, and a nutlike member pivotably mounted on said control arm intermediate its ends, said spindle being screwed into said nutlike member and having a control knob on its front end for pivoting said control arm to different angular positions so as to shift said shaft along said front arm for varying the tension of said resilient means.

6. A vehicle seat as defined in claim 5, further comprising at least one roller on said shaft engaging upon said control arm under the tension of said resilient means and adapted to roll along said control arm when said seat moves upwardly and downwardly.

7. A vehicle seat as defined in claim 5, further comprising a housing secured to and projecting upwardly from said base and enclosing said resilient means and having a front wall and opposite side walls, said pivot means for said lever being mounted on said side walls, said threaded spindle being rotatably but nonslidably mounted in said front wall, said control knob on said spindle projecting from said front wall.

8. A vehicle seat as defined in claim 7, wherein one of said side walls has a curved slot and indicating marks on the outer side of said side wall, and a pointer projecting from the upper end of said control arm through said slot for indicating on said indicating marks the tension of said resilient means.

9. A vehicle seat as defined in claim 7, wherein at least on its lower front side said seat body is provided with a central recess above said housing for receiving the upper part of said housing when said seat body is depressed.

10. A vehicle seat as defined in claim 1, further comprising a shock absorber interposed between said seat support and said lever.

11. A vehicle seat as defined in claim 1, wherein said resilient expansible means includes at least one endless ring made of elastic material.

12. A vehicle seat comprising a base adapted to be secured to the vehicle, a seat body, a support for said seat body, fixed suspension means on said base, a two-armed lever having a pivot axis and front and rear arms projecting toward the opposite sides of said pivot axis, pivot means for pivotably mounting said lever in a fixed position intermediate said seat body and said base, means for connecting the free end of said rear arm to said seat support, adjustable suspension means connected to said front arm at a point spaced at a considerably shorter distance from said pivot axis than the point of connection of said rear arm to said seat support, resilient expansible means mounted on and extending between said fixed and adjustable suspension means, adjusting means for varying the position of said adjustable suspension means on said front arm relative to said pivot axis for varying the tension of said resilient means, vibration-damping means connected at one end to said seat support and at the other end to said base, and connecting means between said seat body and said seat support adapted to permit said seat body to slide in a substantially horizontal direction relative to said seat support, said connecting means comprise tubular members secured to said seat support, and parallel rods slidable within said tubular members, and means for securing said rods to said seat body.

13. A vehicle seat as defined in claim 12, wherein said securing means comprise bearing members secured to said seat body and pivotably connecting said rods to said seat body so as to permit said seat body to be tilted forwardly relative to said seat support.

14. A vehicle seat as defined in claim 13, wherein the surfaces of said seat body and said seat support facing each other are provided with at least one projection on one of said surfaces and at least one row of recesses in the other surface, said projection being adapted to be inserted into and removed from any of said recesses when said seat body is tilted and shifted relative to said seat support.

15. A vehicle seat comprising a base adapted to be secured to the vehicle, a seat body, a support for said seat body, fixed suspension means on said base, a two-armed lever having a pivot axis and front and rear arms projecting toward the opposite sides of said pivot axis, pivot means for pivotably mounting said lever in a fixed position intermediate said seat body and said base, means for connecting the free end of said rear arm to said seat support, adjustable suspension means connected to said front arm at a point spaced at a considerably shorter distance from said pivot axis than the point of connection of said rear arm to said seat support, resilient expansible means mounted on and extending between said fixed and adjustable suspension means, adjusting means for varying the position of said adjustable suspension means on said front arm relative to said pivot axis for varying the tension of said resilient means, vibration-damping means connected at one end to said seat support and at the other end to said base, connecting means between said seat body and said seat support adapted to permit said seat body to slide in a substantially horizontal direction relative to said seat support, and associated locking means on said seat body and said seat support for locking said seat body in different positions in said substantially horizontal direction to said seat support.

References Cited

UNITED STATES PATENTS

| | | | |
|---|---|---|---|
| 2,840,140 | 6/1958 | Harrington | 297—303 XR |
| 2,894,562 | 7/1959 | Peller | 297—304 XR |
| 2,930,563 | 3/1960 | Hirst | 297—302 XR |
| 3,178,148 | 4/1965 | Manke | 297—302 XR |
| 3,218,019 | 11/1965 | Eifes et al. | 248—399 |
| 3,339,906 | 9/1967 | Persson | 248—399 |
| 3,356,413 | 12/1967 | Radke et al. | 297—300 |

FOREIGN PATENTS

| | | |
|---|---|---|
| 744,219 | 1/1950 | Great Britain. |
| 994,608 | 6/1965 | Great Britain. |
| 1,043,715 | 9/1966 | Great Britain. |

BOBBY R. GAY, Primary Examiner

GLENN O. FINCH, Assistant Examiner

U.S. Cl. X.R.

297—302